Jan. 8, 1929.　　　　　A. L. BAILEY　　　　　1,698,527
COOKING UTENSIL
Filed May 31, 1928　　　2 Sheets-Sheet 1
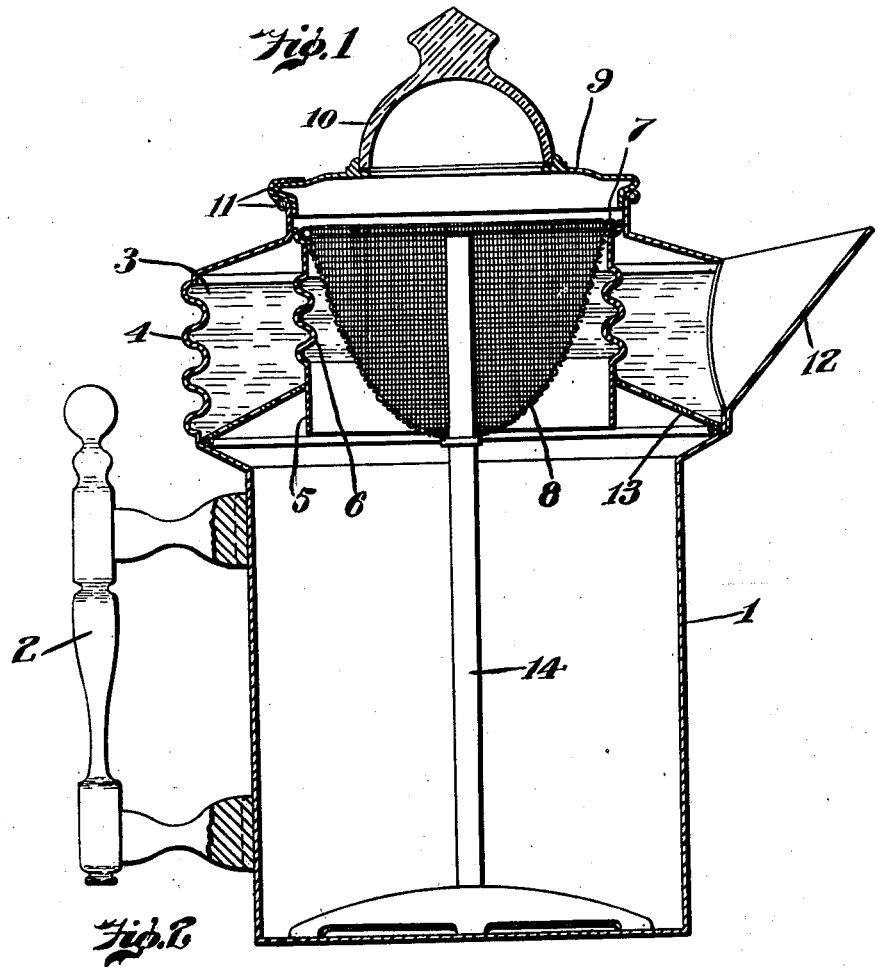
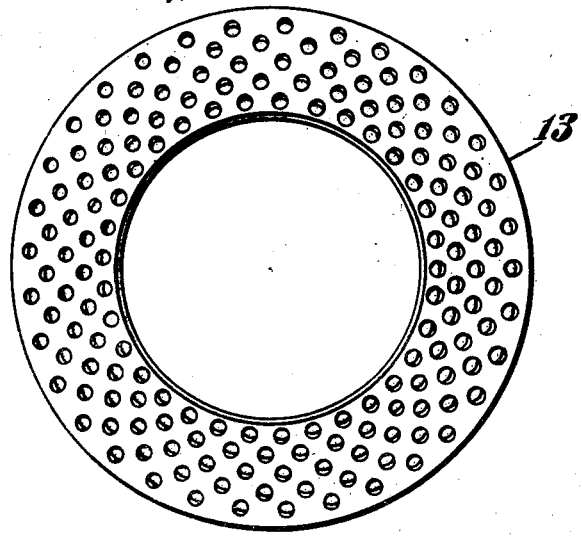
Inventor
Arthur L. Bailey
By Ellis Spear Jr.
Attorney

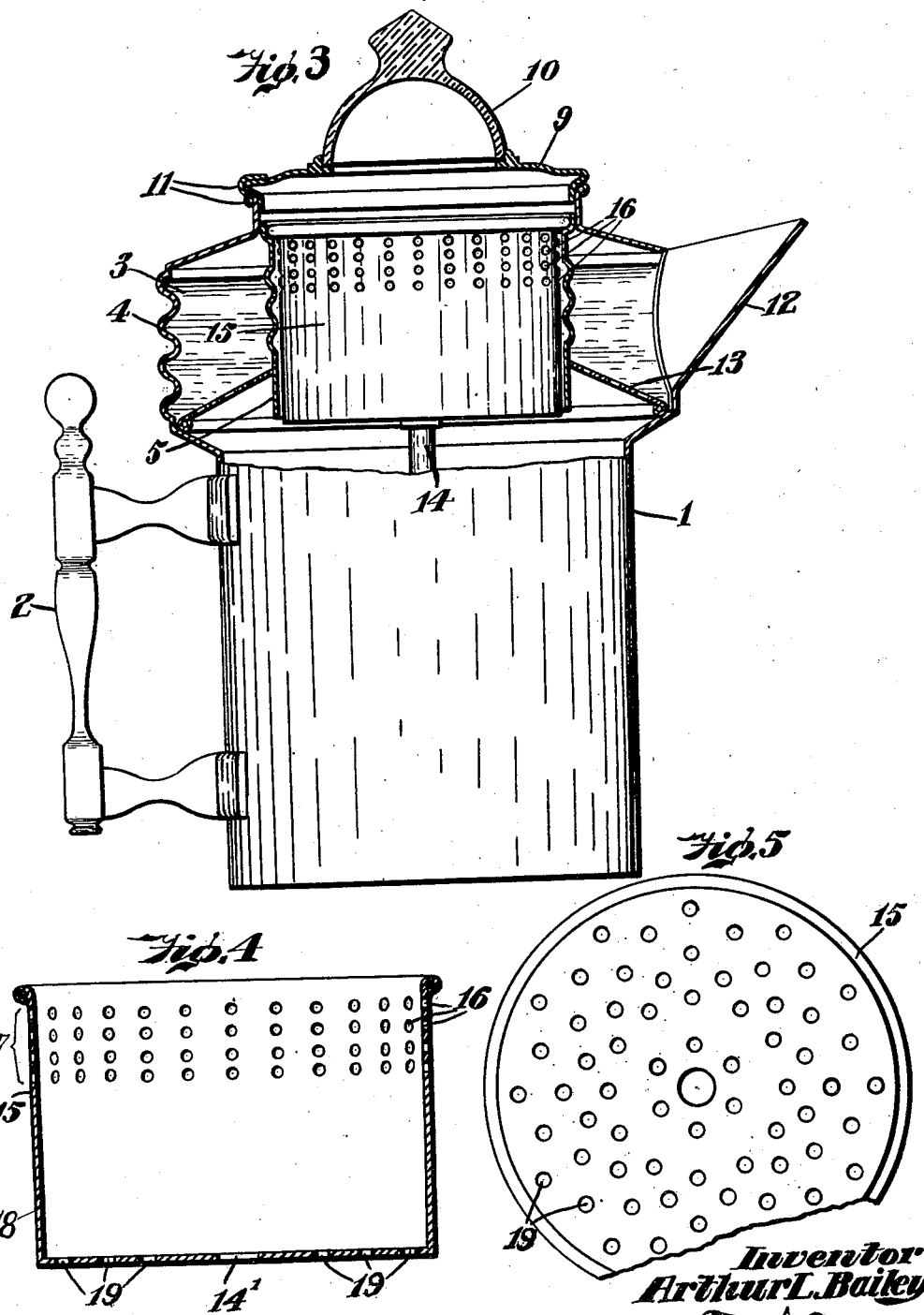

Patented Jan. 8, 1929.

1,698,527

UNITED STATES PATENT OFFICE.

ARTHUR L. BAILEY, OF JAMAICA PLAIN, MASSACHUSETTS.

COOKING UTENSIL.

Application filed May 31, 1928. Serial No. 281,808.

This invention relates to cooking utensils. For the purposes of this application, I will discuss my invention in its adaptation to a coffee pot or percolator, but it will be understood that this treatment is illustrative rather than limiting.

The object of my invention, generally stated, is to prevent boiling over of the contents of the cooking utensil. To this end, my invention consists in the provision of a relatively large expansion chamber near the top of the utensil, which chamber takes care of the expansion of the liquid and thus prevents it from boiling over. Where applied to such an article as a percolator, the expansion chamber moreover permits the pouring spout to be mounted higher up in the wall of the vessel than has hertofore been possible.

My invention also involves certain improvements in the construction and mounting of the coffee holder. Where such holder is the usual cupshaped receptacle, I have provided for retaining the percolated water therein for a sufficient length of time thoroughly to penetrate all of the coffee therein whereby to insure the extraction of all the flavor of the coffee. Where such holder is of the reticulated type, I have provided for exposing all of the coffee therein to the action of the water as it boils up through the percolator tube and percolates down through the coffe, as distinguished from prior constructions wherein the holder has been of such form as to present an annular ring of coffee adjacent its perimeter, which was not penetrated by the water dripping down from the deflector.

Various other features of utility and advantage will appear more fully hereinafter.

In the accompanying drawings, I have shown my invention as applied to a percolator or generally standard type but modified in accordance with the principles of my invention.

Fig. 1 is an elevation partly in section of a percolator in accordance with my invention.

Fig. 2 is a detail view of the baffle plate shown in Fig. 1 removed from the percolator.

Fig. 3 is a view corresponding to Fig. 1 but showing a different form of coffee holder, and Figs. 4 and 5 are detail views of such holder, removed.

I have indicated generally at 1 the body of the percolator of standard type and at 2 the handle thereof. Adjacent its upper end the body of the percolator is enlarged as indicated generally at 3 to provide an expansion or cooling chamber of relatively considerable area as compared with that of the body generally and which chamber permits the expansion of the liquid and thus prevents boiling over of the percolator.

To increase the expansion or cooling surface, the wall of the enlargement 3 is preferably corrugated as indicated at 4 and the usual interior shell 5 of the percolator, which depends into said enlargement, may be similarly corrugated as indicated at 6 for a like purpose.

Supported upon the upper edge of the shell 5 is a ring 7 carrying a coffee holder 8 which may be of any suitable mesh material. The cover 9 carrying the usual glass deflector 10 is hinged at 11 to the upper edge of the percolator and the pouring spout 12 is disposed laterally relative to the enlargement 3 and at a relatively higher point on the percolator than has heretofore been usual.

In order further to assist in separating the steam from the liquid, I may mount adjacent the lower edge of the enlargement 3 a perforated screen 13 within which the shell 5 is centrally disposed.

In use, the enlargement 3 provides an expansion chamber near the top of the percolator, which chamber prevents boiling over of the coffee. The construction of the coffee holder 8 is such that all of the coffee therein is exposed to the action of the water as it boils up through the percolator tube 14 and is deflected by the deflector 11 down through the coffee. This overcomes the disadvantage of previous coffee holders which were of such form as to present an annular ring of unpenetrated coffee adjacent its perimeter.

In the form shown in Figs. 3, 4 and 5, the coffee holder 15 is of the cup type, being formed of sheet metal perforated to permit seepage of the percolated water therethrough. Unlike prior constructions, however, the perforations 16 in the wall of the cup extend only through a relatively narrow zone 17 adjacent the upper open end thereof, the wall of the cup beneath said zone 17 being unperforated as indicated at 18. The number and size or both of the perforations 19 in the cup bottom, moreover, is reduced, so that the cup itself will act to retain the percolated water within the coffee for a sufficient length of time thoroughly to extract the flavor of the coffee, such water eventually flowing through the bottom openings 19 or the upper openings 16 or both.

Various modifications in the construction and operation of my device may obviously be resorted to if within the spirit and scope of my invention as defined by the appended claims.

What I therefore claim and desire to secure by Letters Patent is:

1. In a coffee percolator, a body portion and a relatively considerably larger portion surmounting said body portion and providing an expansion chamber, a shell depending within said expansion chamber, the walls of said shell and expansion chamber being corrugated to assist in breaking up the steam.

2. In a coffee percolator, a body portion and a relatively considerably larger portion surmounting said body portion and providing an expansion chamber, a shell depending within said expansion chamber, the walls of said shell and expansion chamber being corrugated to assist in breaking up the steam, and a perforated screen disposed between the body portion of the percolator and the expansion chamber to further such separating action, the lower edge of the shell being set within said screen.

3. A coffee percolator, a body portion and a relatively considerably larger portion surmounting said body portion and providing an expansion chamber, a shell depending within said expansion chamber, a coffee holder supported on the upper end of said shell internally thereof and constructed and arranged to expose all of its contents to the percolating action.

4. A coffee percolator, a body portion and a relatively considerably larger portion surmounting said body portion and providing an expansion chamber, a shell depending within said expansion chamber, a coffee holder supported on the upper end of said shell internally thereof and constructed and arranged to expose all of its contents to the percolating action, the walls of said shell and expansion chamber being corrugated to assist in breaking up the steam.

5. A coffee percolator, a body portion and a relatively considerably larger portion surmounting said body portion and providing an expansion chamber, a shell depending within said expansion chamber, a coffee holder supported on the upper end of said shell internally thereof and constructed and arranged to expose all of its contents to the percolating action, the walls of said shell and expansion chamber being corrugated to assist in breaking up the steam, and a perforated screen disposed between the body portion of the percolator and the expansion chamber to further such separating action, the lower edge of the shell being set within said screen.

6. In a coffee percolator, a body portion and a relatively considerably larger portion surmounting said body portion and providing an expansion chamber, and a coffee holder disposed within said expansion chamber and having an unperforated area effective to retain the water of percolation therein for a time sufficient to insure extraction of the flavor of the coffee.

7. In a coffee percolator, a body portion and a relatively considerably larger portion surmounting said body portion and providing an expansion chamber, and a coffee holder disposed within said expansion chamber and having an unperforated area effective to retain the water of percolation therein for a time sufficient to insure extration of the flavor of the coffee, said holder having perforations adjacent its top effective to permit eventual escape of such water.

In testimony whereof I affix my signature.

ARTHUR L. BAILEY.